(12) United States Patent
Yoshida (10) Patent No.: US 10,019,301 B2
(45) Date of Patent: Jul. 10, 2018

(54) INFORMATION PROCESSING DEVICE, AND CONTROL METHOD AND STORAGE MEDIUM

(71) Applicant: FUJITSU LIMITED, Kawasaki-shi, Kanagawa (JP)

(72) Inventor: Yuki Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 15/069,174

(22) Filed: Mar. 14, 2016

(65) Prior Publication Data

US 2016/0299808 A1 Oct. 13, 2016

(30) Foreign Application Priority Data

Apr. 8, 2015 (JP) .................................. 2015-079152

(51) Int. Cl.
*G06F 11/00* (2006.01)
*G06F 11/07* (2006.01)
(Continued)

(52) U.S. Cl.
CPC .......... *G06F 11/0772* (2013.01); *G06F 7/764* (2013.01); *G06F 9/30018* (2013.01); *G06F 11/076* (2013.01); *G06F 11/0745* (2013.01)

(58) Field of Classification Search
CPC ............. G06F 11/0772; G06F 11/0745; G06F 11/076; G06F 11/0703; G06F 11/0706; G06F 11/0751; G06F 11/0754; G06F 11/1479; G06F 11/186; G06F 11/2035; G06F 9/30018; G06F 7/764; G06F 2201/85
See application file for complete search history.

(56) References Cited

U.S. PATENT DOCUMENTS 5,675,807 A * 10/1997 Iswandhi ......... G01R 31/31727
                                                            710/260
5,875,342 A *  2/1999 Temple ................... G06F 13/24
                                                            710/260
2013/0246855 A1 * 9/2013 Nishiyama ............ G06F 11/079
                                                             714/37

FOREIGN PATENT DOCUMENTS

JP      2009-140246      6/2009
JP      2010-170462      8/2010
WO   WO 2012/063358 A1   5/2012

OTHER PUBLICATIONS

"PCI Express, Base Specification, Revision 3.0", *PCI-SIG*, Nov. 10, 2010, pp. 1-860.

* cited by examiner

*Primary Examiner* — Bryce P Bonzo
*Assistant Examiner* — Anthony J Amoroso
(74) *Attorney, Agent, or Firm* — Staas & Halsey LLP (57) ABSTRACT

An information processing device includes a processor; and a control device coupled to the processor and configured to receive a packet, determine whether a mask for an interrupt is set, when the received packet is an error message for notifying occurrence of an error in communication between the processor and any of one or more other devices, transmit the interrupt to the processor, when determining that the mask for the interrupt is not set, inhibit transmitting of the interrupt to the processor, when determining that the mask for the interrupt is set; and one or more counter circuits respectively configured to count a number of the error message received while the mask for the interrupt is set, and transmit a value of the number of the error message to the processor in accordance with an instruction from the processor.

13 Claims, 9 Drawing Sheets

(51) Int. Cl.
*G06F 9/30* (2018.01)
*G06F 7/76* (2006.01)

INFORMATION PROCESSING DEVICE, AND CONTROL METHOD AND STORAGE MEDIUM

CROSS-REFERENCE TO RELATED APPLICATION

This application is based upon and claims the benefit of priority of the prior Japanese Patent Application No. 2015-079152, filed on Apr. 8, 2015, the entire contents of which are incorporated herein by reference.

FIELD

The embodiments discussed herein are related to an information processing device, and a control method and a storage medium.

BACKGROUND

When an error occurs, an interface device that couples an arithmetic processing device, such as a central processing unit (CPU), to another device notifies of the occurrence of the error by an interrupt to the arithmetic processing device. For example, in a PCI express (hereinafter, referred to as "PCIe"), a root complex is notified of an error related to a PCIe bus by an error message, and when receiving the error message, the root complex notifies the arithmetic processing device of the occurrence of the error by an interrupt. Here, the root complex is a top device out of a plurality of devices coupled in a tree form in the PCIe and is coupled to the arithmetic processing device.

An error processing unit of an operating system (OS) operated in an arithmetic processing device displays or logs a device that have detected an error and an error type in order to allow a maintenance personnel or the like to determine an abnormal spot. The error processing unit is requested to properly process an error detected in each of the plurality of devices coupled to the PCIe bus.

Regarding error process, there is an existing technique that reduces an error processing load due to frequent error occurrence by counting the number of error occurrence and notifying a diagnosis device at the time when the number of error occurrence reaches a preset threshold.

In a PCIe as well, there is a related technique that enables flexible error detection appropriate for the system by counting errors by a counter circuit, and when errors of the number allowed to be set by a user occur, performing interrupt notification. There is a related technique that allows an operator to understand a failed spot in a short period of time by determining, when an interrupt occurs, whether the interrupt is a periodic interrupt or an error interrupt, and when the interrupt is a periodic interrupt, storing error history information and specifying a suspicious spot of the error at the time of the error interrupt. Related art is disclosed in, for example, Japanese Laid-open Patent Publication No. 2010-170462, Japanese Laid-open Patent Publication No. 2009-140246, and International Publication Pamphlet No. WO2012/063358.

The root complex sometimes receives error messages from a plurality of devices in one time. Alternatively, it also sometimes receives a large number of error messages instantaneously from one or a plurality of devices due to frequent occurrence of an error for a temporary noise or the like. For example, when the transmission rate per lane is 8 giga (G) bits/second and a link is formed with eight lanes, a PCIe has transmission performance of 64 Gbits/second. One packet size is estimated at most as approximately 600 bytes. Accordingly, the PCIe is capable of communicating 10,000,000 or more packets in a second. Even when $\frac{1}{100}$ of the packets become errors for a temporary noise and the like, there is a possibility that 100,000 error messages are transmitted to the root complex in a second.

It is difficult that the error processing unit processes them one by one. Even when it tries, there are problems that the processing load on the error processing unit increases and thus other processes are affected. Even in the related technique to interrupt when the number of error occurrence reaches a preset threshold, it is difficult to set the threshold. As just described, it is desired to be able to avoid a process of the arithmetic processing device to an error of the interface device from affecting other processes.

SUMMARY

According to an aspect of the invention, an information processing device includes a processor; and a control device coupled to the processor and configured to receive a packet, determine whether a mask for an interrupt is set, when the received packet is an error message for notifying occurrence of an error in communication between the processor and any of one or more other devices, transmit the interrupt to the processor, when determining that the mask for the interrupt is not set, inhibit transmitting of the interrupt to the processor, when determining that the mask for the interrupt is set; and one or more counter circuits respectively configured to count a number of the error message received while the mask for the interrupt is set, and transmit a value of the number of the error message to the processor in accordance with an instruction from the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Detailed descriptions are given below to an information processing device, a method of controlling an information processing device, and embodiments of a control device disclosed herein based on the drawings. The embodiments do not limit the disclosed technique.

First Embodiment

Figure 1:
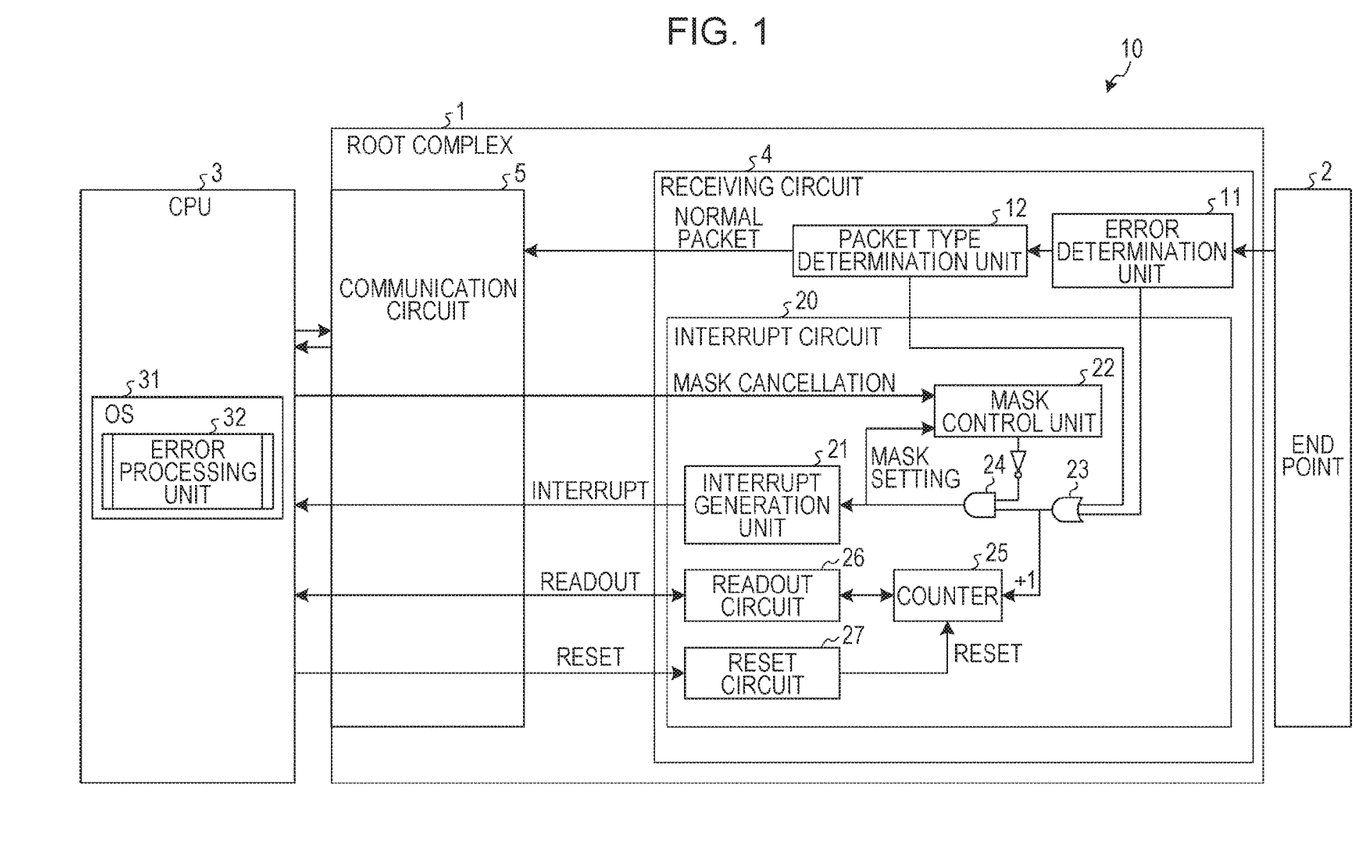
FIG. 1 is a block diagram illustrating a configuration of an information processing device according to a first embodiment.

Firstly, a configuration of an information processing device according to a first embodiment is described. FIG. 1 is a block diagram illustrating a configuration of an information processing device according to the first embodiment. As illustrated in FIG. 1, an information processing device 10 according to the first embodiment includes a root complex 1, an end point 2, and a central processing unit (CPU) 3.

The root complex 1 is a top device out of a plurality of PCI devices coupled in a tree form and is coupled to the CPU 3. The end point 2 is a PCI device. When detecting an error on a PCIe bus, the end point 2 transmits a packet of an error message to the root complex 1. The CPU 3 is a device to perform arithmetic processing. In the CPU 3, an operating system (OS) 31 is operated. The OS 31 includes an error processing unit 32 to process an error of a PCIe.

The root complex 1 includes a receiving circuit 4 and a communication circuit 5. The receiving circuit 4 is a circuit to receive a packet transmitted from the end point 2. The communication circuit 5 is an interface circuit with the CPU 3.

The receiving circuit 4 includes an error determination unit 11, a packet type determination unit 12, and an interrupt circuit 20. When detecting an error on a PCIe bus, the error determination unit 11 notifies the interrupt circuit 20 of the error. When receiving the packet transmitted by the end point 2, the error determination unit 11 passes the packet to the packet type determination unit 12.

The packet type determination unit 12 determines whether the packet is a normal packet or a packet of an error message. When the packet is a normal packet, the packet type determination unit 12 transmits the normal packet to the CPU 3 via the communication circuit 5. In contrast, when the packet is a packet of an error message, the packet type determination unit 12 notifies the interrupt circuit 20 of the error.

When notified of the error, the interrupt circuit 20 generates an interrupt to the CPU 3 via the communication circuit 5. The interrupt circuit 20 includes an interrupt generation unit 21, a mask control unit 22, an OR circuit 23, an AND circuit 24, a counter 25, a readout circuit 26, and a reset circuit 27.

The interrupt generation unit 21 generates an interrupt to the CPU 3. The mask control unit 22 applies mask control to the interrupt generation unit 21. A mask by the mask control unit 22 is set when an interrupt is generated by the interrupt generation unit 21 and is cancelled based on an instruction of the error processing unit 32.

The OR circuit 23 implements a logical sum of an error notification from the error determination unit 11 and an error notification from the packet type determination unit 12 and outputs the result to the AND circuit 24 and the counter 25. The AND circuit 24 implements a logical product of negation of a mask output of the mask control unit 22 and the OR circuit 23 and outputs the result to the interrupt generation unit 21 and the mask control unit 22. That is, when there is an error notification from the error determination unit 11 or an error notification from the packet type determination unit 12 and a mask of the mask control unit 22 is not set, interrupt generation is performed by the interrupt generation unit 21 and a mask of the mask control unit 22 is set.

The counter 25 increments the counter value by 1 when the output of the OR circuit 23 is 1. The counter 25 is reset by the reset circuit 27. The readout circuit 26 reads the value of the counter 25 based on the instruction of the error processing unit 32 and passes the read value to the error processing unit 32. The reset circuit 27 resets the counter 25 based on the instruction of the error processing unit 32.

When receiving an error notification by an interrupt, the error processing unit 32 displays the information on the error on a display device or logs the information on the error. The information on the error includes an error level and information on the device where the error has occurred. The error processing unit 32 may obtain the information on the error from the error notification or may obtain from a buffer or the like. When a PCIe has an advanced error reporting (AER) function, the error processing unit 32 may display or log the contents of an AER status register.

When receiving an error notification by an interrupt, the error processing unit 32 instructs the root complex 1 to read the counter 25 and reset the counter 25. The error processing unit 32 instructs the root complex 1 to cancel the mask at the timing available for a process of a next error.

Figure 2:
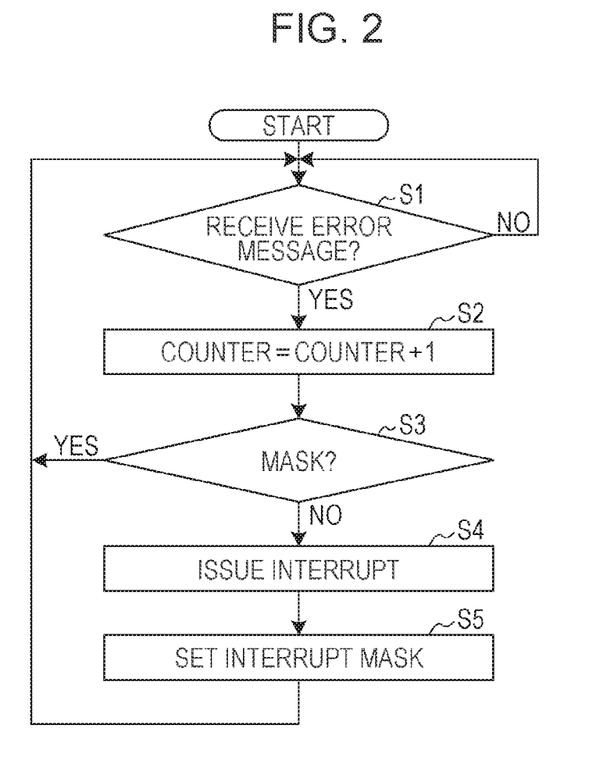
FIG. 2 is a flow chart illustrating a flow of an interrupt process by an interrupt circuit.

Next, a flow of an interrupt process by the interrupt circuit 20 is described. FIG. 2 is a flow chart illustrating a flow of an interrupt process by the interrupt circuit 20. As illustrated in FIG. 2, the interrupt circuit 20 determines whether or not an error message is received (S1). When determination is made that an error message is not received, the determination of whether or not an error message is received is repeated.

In contrast, when determination is made that an error message is received, the interrupt circuit 20 adds 1 to the counter 25 (S2). Subsequently, the interrupt circuit 20 determines whether or not interrupt generation is masked (S3). When determination is made that the interrupt generation is masked, the process goes back to S1. In contrast, when determination is made that the interrupt generation is not masked, the interrupt circuit 20 issues an interrupt to the CPU 3 (S4). After that, the interrupt circuit 20 sets an interrupt mask (S5).

In such a manner, the interrupt circuit 20 masks interrupt generation, thereby enabling reduction in occurrence of an interrupt to the CPU 3 and reduction in the processing load by the error processing unit 32.

The receiving circuit 4 illustrated in FIG. 1 handles all errors similarly. In errors of a PCIe, there are correctable errors (CE) that are errors that may be corrected, fatal errors (FE) that are fatal errors that may not be corrected, and non-FEs (NFE) that are minor errors that may not be corrected. Accordingly, it is considered to generate an interrupt for each error level. Therefore, the case in which the interrupt circuit 20 generates an interrupt for each error level is described.

Figure 3:
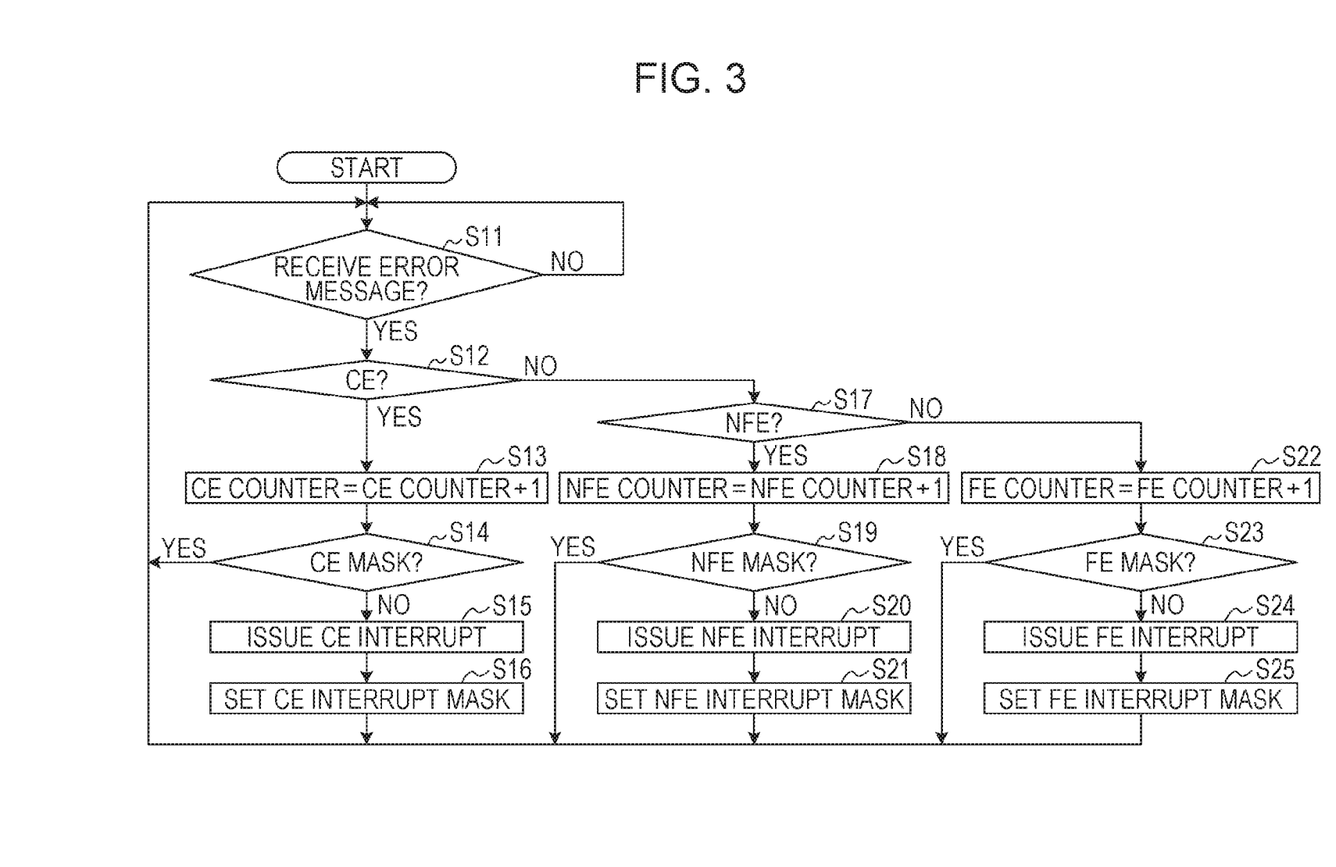
FIG. 3 is a flow chart illustrating a flow of an interrupt process when the interrupt circuit generates an interrupt for each error level.

FIG. 3 is a flow chart illustrating a flow of an interrupt process when the interrupt circuit 20 generates an interrupt for each error level. The interrupt circuit 20 includes a CE interrupt generation unit, an FE interrupt generation unit, and an NFE interrupt generation unit that respectively generate a CE interrupt, an FE interrupt, and an NFE interrupt. The interrupt circuit 20 includes a CE mask control unit, an FE mask control unit, and an NFE mask control unit that respectively mask a CE interrupt, an FE interrupt, and an NFE interrupt. The interrupt circuit 20 includes a CE counter, an FE counter, and an NFE counter that respectively count the numbers of CEs, FEs, and NFEs while a mask is set.

As illustrated in FIG. 3, the interrupt circuit 20 determines whether or not an error message is received (S11). When determination is made that an error message is not received, the determination of whether or not an error message is received is repeated.

In contrast, when determination is made that an error message is received, the interrupt circuit 20 determines whether or not the error message is a message on a CE (S12). When determination is made that the error message is a message on a CE, the interrupt circuit 20 adds 1 to the CE counter (S13). Then, the interrupt circuit 20 determines whether or not there is a CE mask, that is, whether or not CE interrupt generation is masked (S14). When determination is made that the interrupt generation is CE masked, the process goes back to S11. In contrast, when determination is made that the interrupt generation is not CE masked, the interrupt circuit 20 issues a CE interrupt to the CPU 3 (S15). Then, the interrupt circuit 20 sets a CE interrupt mask (S16).

In contrast, when determination is made that the error message is not a message on a CE, the interrupt circuit 20 determines whether or not the error message is a message on an NFE (S17). Then, when determination is made that the error message is a message on an NFE, the interrupt circuit 20 adds 1 to the NFE counter (S18). Then, the interrupt circuit 20 determines whether or not there is an NFE mask, that is, whether or not NFE interrupt generation is masked (S19). Then, when determination is made that the interrupt generation is NFE masked, the interrupt circuit 20 goes back to S11. In contrast, when determination is made that the interrupt generation is not NFE masked, the interrupt circuit 20 issues an NFE interrupt to the CPU 3 (S20). Then, the interrupt circuit 20 sets an NFE interrupt mask (S21).

In contrast, when determination is made that the error message is not a message on an NFE, the interrupt circuit 20 adds 1 to the FE counter (S22). Subsequently, the interrupt circuit 20 determines whether or not there is an FE mask, that is, whether or not FE interrupt generation is masked (S23). Then, when the interrupt generation is FE masked, the interrupt circuit 20 goes back to S11. In contrast, when the interrupt generation is not FE masked, the interrupt circuit 20 issues an FE interrupt to the CPU 3 (S24). Then, the interrupt circuit 20 sets an FE interrupt mask (S25).

In such a manner, the interrupt circuit 20 generates an interrupt for each error level, thereby enabling the error processing unit 32 to perform error level display, error process in accordance with the error level, and the like.

Figure 4:
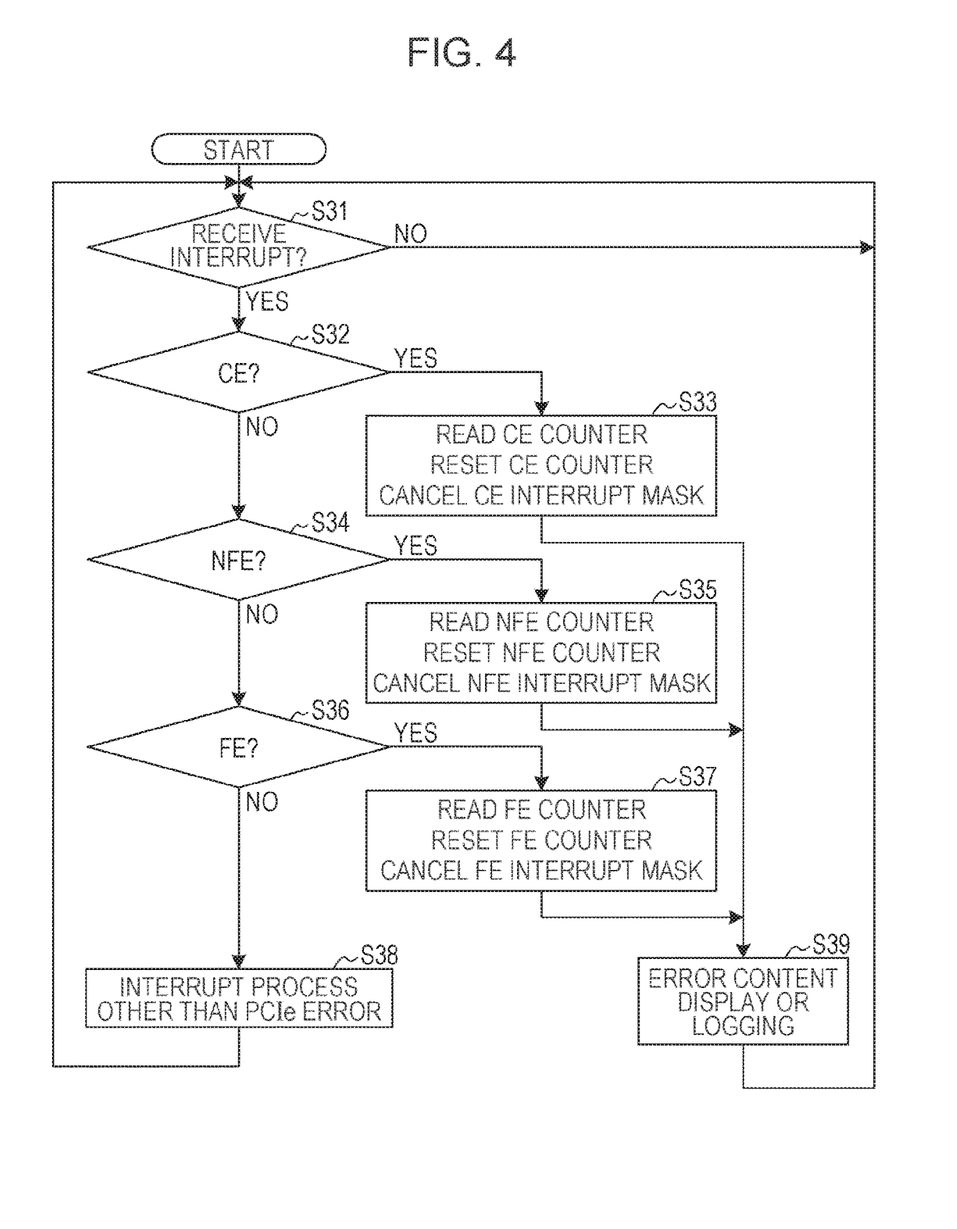
FIG. 4 is a flow chart illustrating a flow of error process by an error processing unit.

Next, a flow of error process by the error processing unit 32 is described. FIG. 4 is a flow chart illustrating a flow of error process by the error processing unit 32. In FIG. 4, the error processing unit 32 receives an interrupt for each error level.

As illustrated in FIG. 4, the error processing unit 32 determines whether or not an interrupt is received (S31). When determination is made that an interrupt is not received, the error processing unit 32 repeats the determination of whether or not an interrupt is received. In contrast, when determination is made that an interrupt is received, the error processing unit 32 determines whether or not the interrupt is a CE of a PCIe error (S32). When determination is made that the interrupt is a CE, the error processing unit 32 reads the CE counter, resets the CE counter, and cancels the CE interrupt mask (S33). Then, the error processing unit 32 displays or logs an error content (S39). After that, the process goes back to S31.

In contrast, when determination is made that the interrupt is not a CE of a PCIe error, the error processing unit 32 determines whether or not the interrupt is an NFE (S34). When determination is made that the interrupt is an NFE, the NFE counter is read, the NFE counter is reset, and the NFE interrupt mask is cancelled (S35). Then, the error processing unit 32 displays or logs an error content (S39) and goes back to S31.

In contrast, when determination is made that the interrupt is not an NFE of a PCIe error, the error processing unit 32 determines whether or not the interrupt is an FE (S36). When determination is made that the interrupt is an FE, the FE counter is read, the FE counter is reset, and the FE interrupt mask is cancelled (S37). Then, the error processing unit 32 displays or logs an error content (S39). After that, the process goes back to S31. In contrast, when determination is made that the interrupt is not an FE of a PCIe error, the error processing unit 32 performs an interrupt process of other than a PCIe error (S38). After that, the process goes back to S31.

In such a manner, the error processing unit 32 cancels the interrupt mask, thereby enabling the interrupt generation unit 21 to newly generate an interrupt without affecting other processes of the CPU 3.

Figure 5:
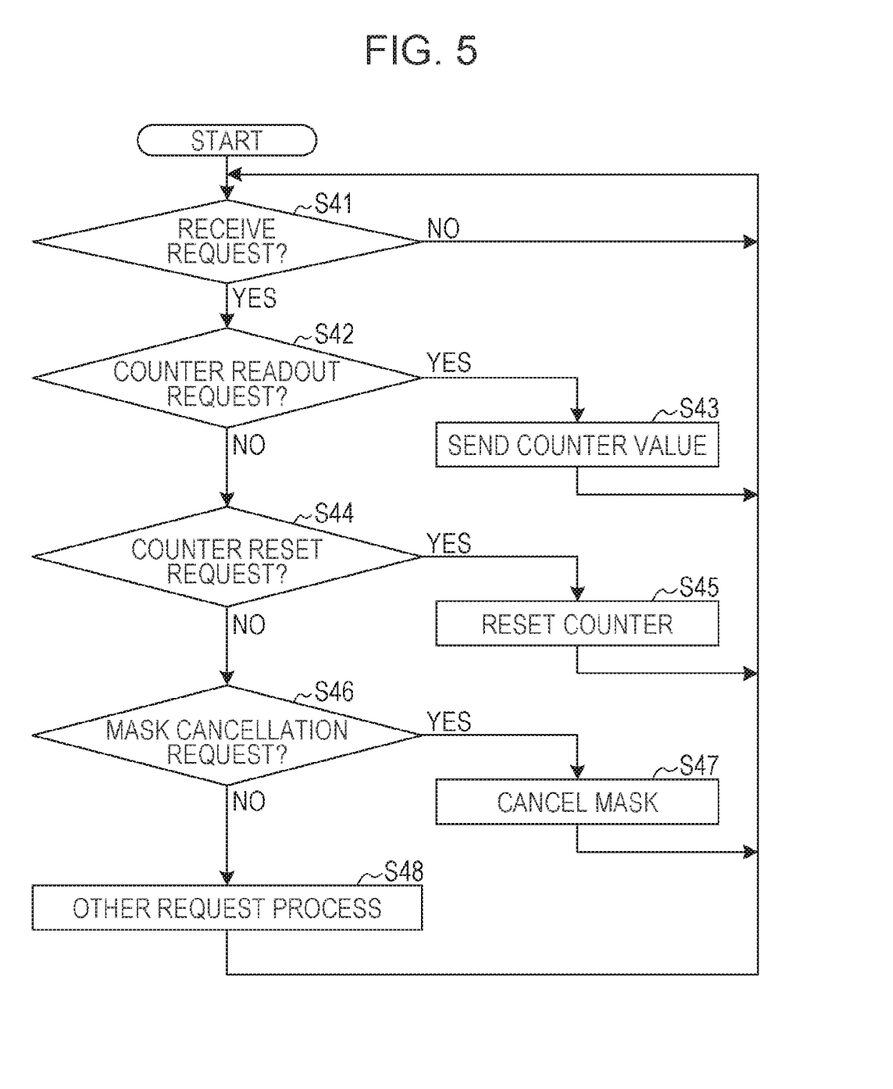
FIG. 5 is a flow chart illustrating a flow of request process by the interrupt circuit.

Next, a flow of request process by the interrupt circuit 20 is described. Here, the request process is a process of a request for counter readout, counter reset, mask cancellation, and the like from the error processing unit 32.

FIG. 5 is a flow chart illustrating a flow of request process by the interrupt circuit 20. As illustrated in FIG. 5, the interrupt circuit 20 determines whether or not a request is received from the error processing unit 32 (S41), and when a request is not received, the determination of whether or not a request is received is repeated.

In contrast, when a request is received, the interrupt circuit 20 determines whether or not the request is a counter readout request (S42). When determination is made that the request is a counter readout request, the counter value is transmitted to the CPU 3 (S43). After that, the process goes back to S41.

In contrast, when determination is made that the request is not a counter readout request, the interrupt circuit 20 determines whether or not the request is a counter reset request (S44). When determination is made that the request is a counter reset request, the counter is reset (S45). After that, the process goes back to S41.

In contrast, when determination is made that the request is not a counter reset request, the interrupt circuit 20 determines whether or not the request is a mask cancellation request (S46). When determination is made that the request is a mask cancellation request, the mask is cancelled (S47) and the process goes back to S41. In contrast, when determination is made that the request is not a mask cancellation request, the interrupt circuit 20 performs another request process (S48). After that, the process goes back to S41.

In such a manner, the interrupt circuit 20 performs mask cancellation based on a request from the error processing unit 32, thereby enabling the interrupt generation unit 21 to newly generate an interrupt.

Figure 6:
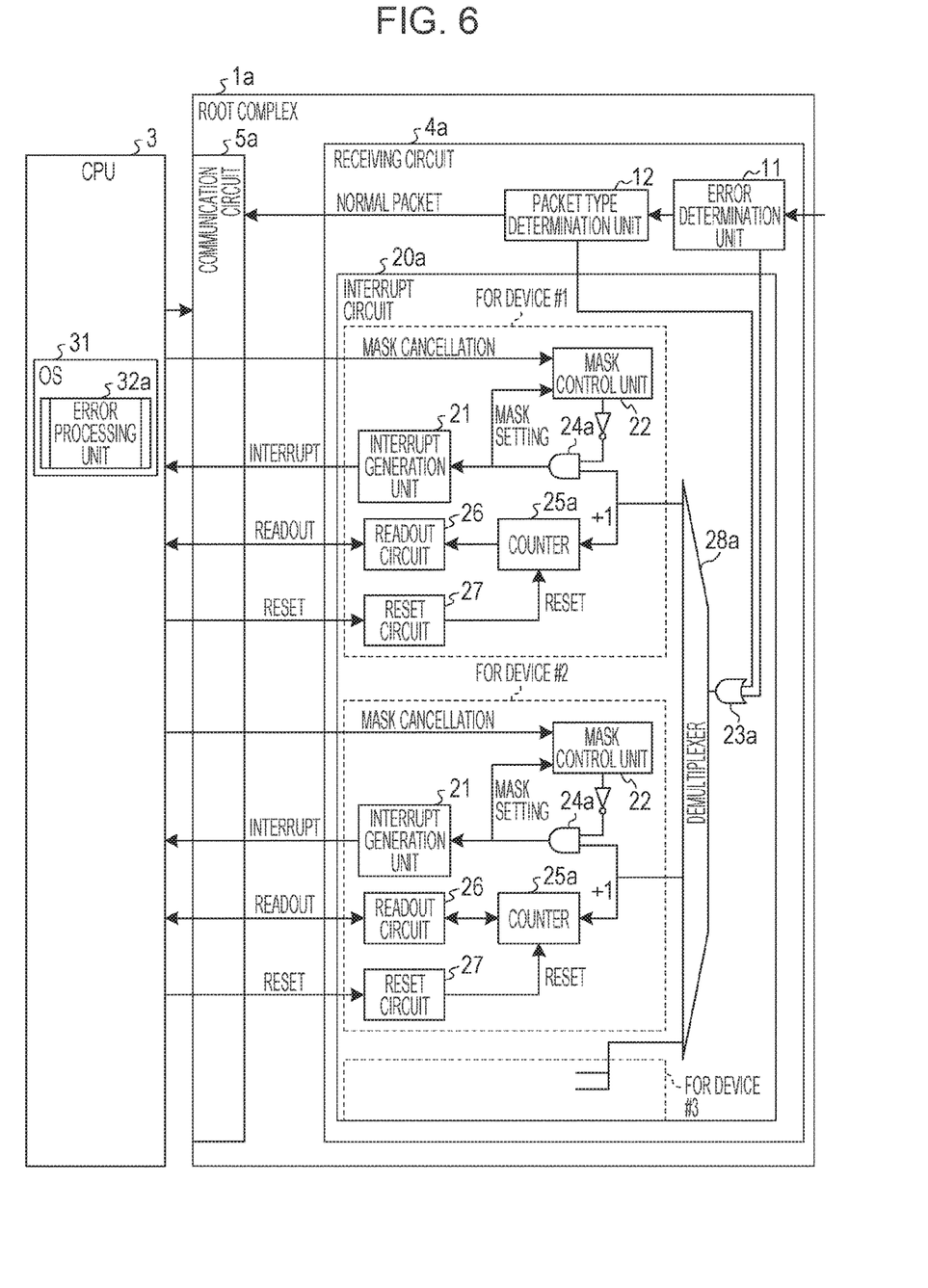
FIG. 6 is a block diagram illustrating a configuration of an interrupt circuit when a plurality of devices are coupled to a root complex.

Although one device is coupled to the root complex 1 in the receiving circuit 4 illustrated in FIG. 1, a plurality of devices may be coupled to a root complex. FIG. 6 is a block diagram illustrating a configuration of an interrupt circuit 20a when a plurality of devices are coupled to a root complex 1a. Here, for the convenience of description, an identical reference character is given to a functional unit that plays a similar role to the respective unit illustrated in FIG. 1 to omit detailed descriptions thereof.

As illustrated in FIG. 6, the root complex is includes a receiving circuit 4a and a communication circuit 5a. The receiving circuit 4a receives packets from a plurality of devices and includes the error determination unit 11, the packet type determination unit 12, and the interrupt circuit 20a. The interrupt circuit 20a includes, as much as the number of devices, the interrupt generation units 21, the mask control units 22, AND circuits 24a, counters 25a, the readout circuits 26, and the reset circuits 27 and includes each one of an OR circuit 23a and a demultiplexer 28a. FIG. 6 illustrates details of the interrupt circuit 20a for two devices.

The OR circuits 23a implement a logical sum of an error notification from the error determination unit 11 and an error notification from the packet type determination unit 12 and output the result to the demultiplexer 28a. The demultiplexer 28a outputs an error notification to the AND circuits 24a and the counters 25a corresponding to the respective devices. The AND circuit 24a corresponding to each device implements a logical product of negation of output of the corresponding mask control unit 22 and output of the demultiplexer 28a and outputs the result to the corresponding interrupt generation unit 21 and the corresponding mask control unit 22. When receiving an error notification corresponding to each device from the demultiplexer 28a, the counter 25a corresponding to each device increments the value by 1.

The communication circuit 5a relays communication of the CPU 3 with the interrupt generation units 21 corresponding to the respective devices, the mask control units 22 corresponding to the respective devices, the readout circuits 26, and the reset circuits 27. The OS 31 includes an error processing unit 32a. The error processing unit 32a processes errors detected by the plurality of devices.

Figure 7:
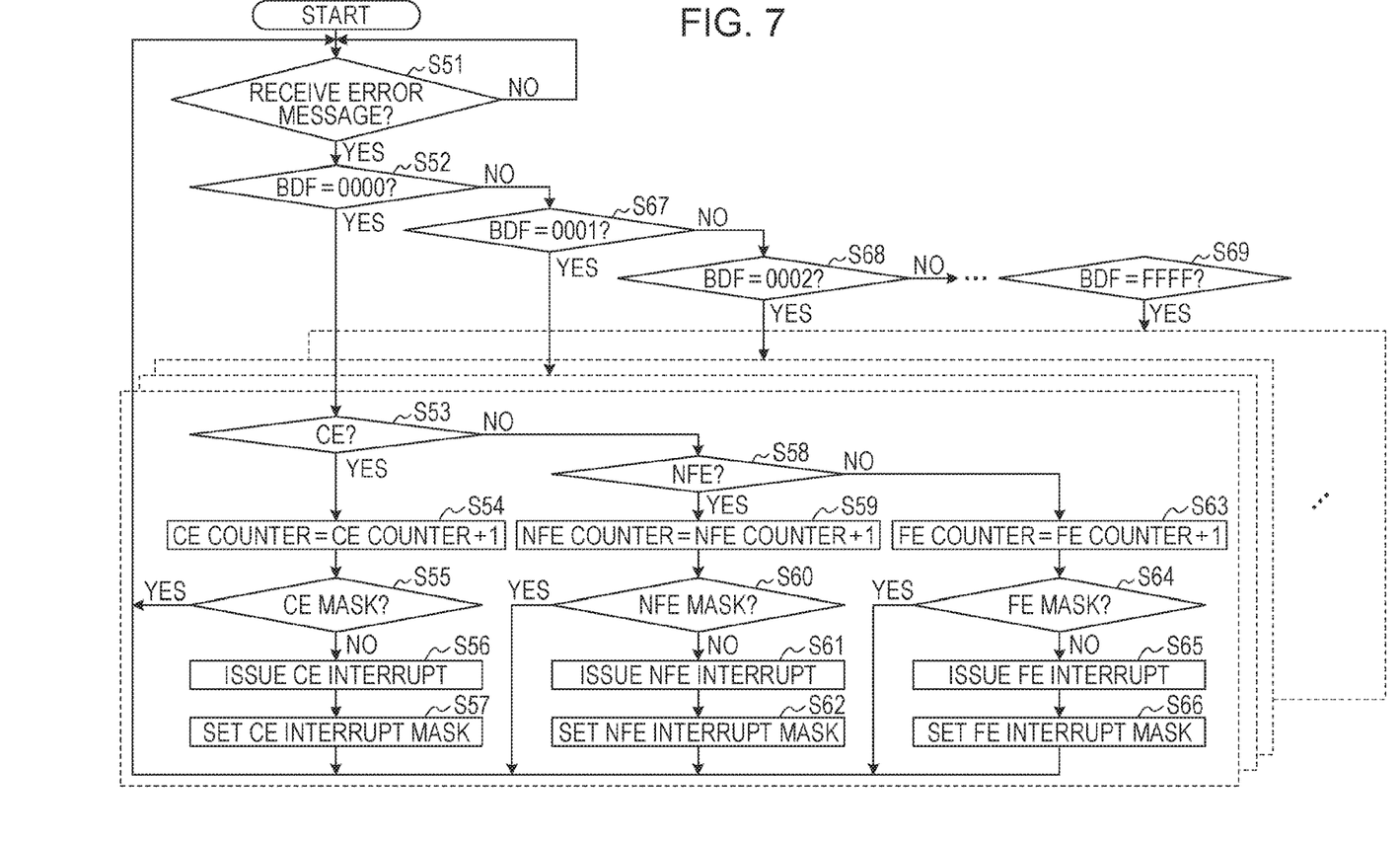
FIG. 7 is a flow chart illustrating a flow of an interrupt process by the interrupt circuit when a plurality of devices are coupled to a root complex.

FIG. 7 is a flow chart illustrating a flow of an interrupt process by the interrupt circuit 20a when a plurality of devices are coupled to the root complex 1a. FIG. 7 illustrates the case in which the interrupt circuit 20a generates an interrupt for each error level for each device.

As illustrated in FIG. 7, the interrupt circuit 20a determines whether or not an error message is received (S51). When determination is made that an error message is not received, the determination of whether or not an error message is received is repeated.

In contrast, when determination is made that an error message is received, the interrupt circuit 20a determines whether or not the error message is a message on BDF=0000 (S52). Here, the BDF is an identification number to identify a device and is a bus/device/function number. One device may have a plurality of functions. In this case, however, each device is supposed to have one function.

When determination is made that the error message is not a message on BDF=0000, the interrupt circuit 20a determines whether or not the error message is a message on BDF=0001 (S67). Then, when determination is made that the error message is not a message on BDF=0001, the interrupt circuit 20a determines whether or not the error message is a message on BDF=0002 (S68). Similarly, the interrupt circuit 20a determines on which device the error message is while incrementing the BDF by one each time. In FIG. 7, determination is made until whether or not the error message is a message on BDF=FFFF (S69).

When the error message is specified as a message on which device, the interrupt circuit 20a performs an interrupt process for the specified device. That is, the interrupt circuit 20a determines whether or not the error message is a message on a CE (S53). When determination is made that the error message is a message on a CE, the interrupt circuit 20a adds 1 to the CE counter (S54). Then, the interrupt circuit 20a determines whether or not there is a CE mask (S55). When determination is made that the error message is CE masked, the process goes back to S51. In contrast, when determination is made that the error message is not CE masked, the interrupt circuit 20a issues a CE interrupt to the CPU 3 (S56). Then, the interrupt circuit 20a sets a CE interrupt mask (S57).

In contrast, when the error message is not a message on a CE, the interrupt circuit 20a determines whether or not the error message is a message on an NFE (S58). Then, when the error message is a message on an NFE, the interrupt circuit 20a adds 1 to the NFE counter (S59) and determines whether or not there is an NFE mask (S60). Then, when the error message is NFE masked, the interrupt circuit 20a goes back to S51. In contrast, when the error message is not NFE masked, the interrupt circuit 20a issues an NFE interrupt to the CPU 3 (S61) and sets an NFE interrupt mask (S62).

In contrast, when the error message is not a message on an NFE, the interrupt circuit 20a adds 1 to the FE counter (S63) and determines whether or not there is an FE mask (S64). Then, when the error message is FE masked, the interrupt circuit 20a goes back to S51. In contrast, when the error message is not FE masked, the interrupt circuit 20a issues an FE interrupt to the CPU 3 (S65) and sets an FE interrupt mask (S66).

In such a manner, the interrupt circuit 20a generates an interrupt for each error level for each device, thereby enabling the error processing unit 32a to perform display of a device in which an error has occurred, error level display, and error process in accordance with the error level.

As just described above, in the first embodiment, the mask control unit 22 performs mask control in which setting by generation of an interrupt by the interrupt generation unit 21 and cancellation by the error processing unit 32 are performed, and the interrupt generation unit 21 performs generation of an interrupt based on the mask control by the mask control unit 22. Accordingly, the error processing unit 32 is capable of processing an interrupt of a PCIe without affecting other processes by the CPU 3.

In the first embodiment, the counter 25 counts the number of the error message received while an interrupt is masked, and the readout circuit 26 reads the value of the counter 25 based on an instruction of the error processing unit 32 to transmit the value to the error processing unit 32. Accordingly, the error processing unit 32 is capable of accurately learning the number of error occurrence and accurately determining a failure of a PCIe.

The root complex 1a is coupled to a plurality of devices, and the interrupt circuit 20a has, as much as the number of devices, the interrupt generation units 21, the mask control units 22, the AND circuits 24a, the counters 25a, the readout circuits 26, and the reset circuits 27. Accordingly, the receiving circuit 4a is capable of performing mask control of interrupt generation for each device.

In the first embodiment, the case in which the error processing unit separately obtains the counter value, resets the counter, and cancels the mask is described. However, at the same time as the readout circuit 26 reads the value of the counter and transmits the value to the error processing unit, the interrupt circuit may simultaneously reset the counter and cancel the mask. The counter value is obtained at the same time as the counter is reset, and thereby the interrupt circuit may avoid omission or repetition in the counted number and count the more accurate number of errors. It also allows process by the error processing unit only in one time, so that the processing load on the error processing unit may be reduced.

Second Embodiment

Figure 8:
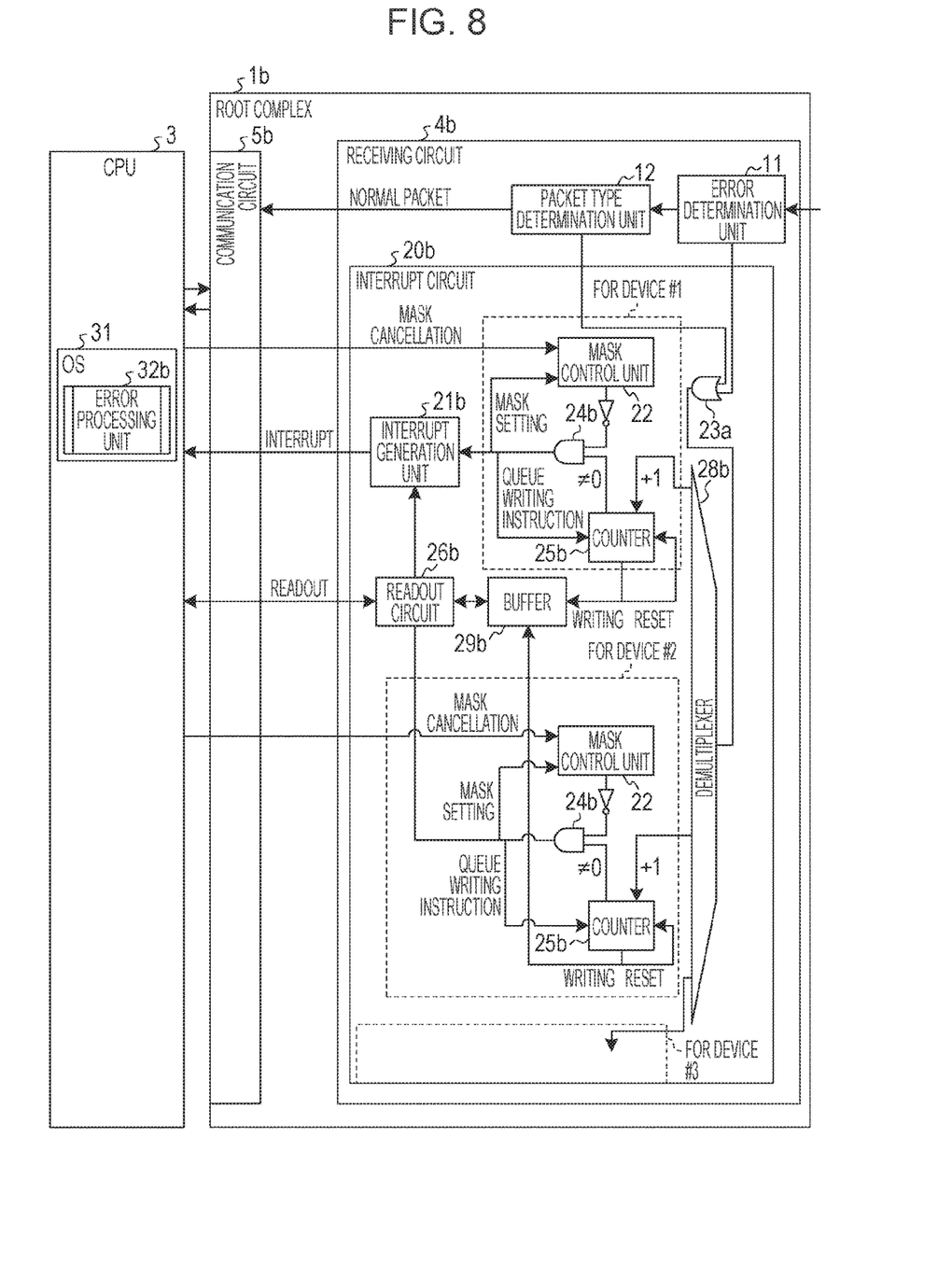
FIG. 8 is a block diagram illustrating a configuration of an interrupt circuit that has some circuits shared with devices.

In the first embodiment described above, when the root complex 1a is coupled to a plurality of devices, independent circuits for interrupts are provided for the respective devices. However, some circuits may also be shared with devices. Therefore, in a second embodiment, an interrupt circuit that has some circuits shared with devices is described. FIG. 8 is a block diagram illustrating a configuration of the interrupt circuit that has some circuits shared with devices. Here, for the convenience of description, an identical reference character is given to a functional unit that plays a similar role to the respective unit illustrated in FIG. 6 to omit detailed descriptions thereof.

As illustrated in FIG. 8, a root complex 1b includes a receiving circuit 4b and a communication circuit 5b. The receiving circuit 4b receives packets from a plurality of devices and includes the error determination unit 11, the packet type determination unit 12, and an interrupt circuit 20b. The interrupt circuit 20b includes, as much as the number of devices, the mask control units 22, AND circuits 24b, and counters 25b. The interrupt circuit 20b includes each one of an interrupt generation unit 21b, the OR circuit 23a, a readout circuit 26b, a demultiplexer 28b, and a buffer 29b. That is, the interrupt generation unit 21b, the readout circuit 26b, and the buffer 29b are shared with devices. FIG. 8 illustrates details of the interrupt circuit 20b for two devices.

The demultiplexer 28b outputs an error notification to the counters 25b corresponding to the respective devices. The AND circuit 24b corresponding to each device implements a logical product of negation of output of the corresponding mask control unit 22 and a signal indicating that the value of the corresponding counter 25b is not 0. Then, the demultiplexer 28b outputs the result to the interrupt generation unit 21b, the corresponding mask control unit 22, and the corresponding counter 25b.

When receiving a value, 1, indicating a corresponding error notification from the demultiplexer 28b, the counter 25b corresponding to each device increments the value by 1. The counter 25b corresponding to each device receives output, 1, of the corresponding AND circuit 24b as a queue writing instruction and writes the value in the buffer 29b and also resets the counter 25b itself.

The buffer 29b stores a value of the counter 25b corresponding to the device in which an interrupt is generated. The value of the buffer 29b is read by the readout circuit 26b. The interrupt generation unit 21b receives an instruction of interrupt generation from the AND circuit 24b corresponding to each device.

A condition for interrupt generation is made that the value of the counter 25b is not 0, thereby enabling the interrupt generation unit 21b to generate an interrupt as long as an error message is received while a mask is set even when an error message is not received after mask cancellation. An interrupt is generated and also the value of the counter 25b is written in the buffer 29b, thereby enabling the interrupt circuit 20b to accurately store a counted value at the time of the interrupt generation in the buffer 29b.

The communication circuit 5b relays communication of the CPU 3 with the interrupt generation unit 21b, the mask control units 22, and the readout circuit 26b. The OS 31 has an error processing unit 32b. The error processing unit 32b processes an interrupt from the interrupt generation unit 21b and instructs the readout circuit 26b to readout the buffer 29b. When receiving the readout instruction of the buffer 29b, the readout circuit 26b reads the buffer 29b. At the time when a next error process is available, the error processing unit 32b instructs the mask control unit 22 that has set a mask during interrupt generation to cancel the mask.

As just described above, in the second embodiment, the interrupt generation unit 21b, the readout circuit 26b, and the buffer 29b are shared with devices. Accordingly, the resources to be used by the interrupt circuit 20b may be reduced.

In the second embodiment, when writing the value in the buffer 29b, the counter 25b resets the counter 25b itself. It is thus possible not to use the reset circuits 27 and to reduce the resources to be used by the interrupt circuit 20b.

In the second embodiment, the case in which the interrupt generation unit 21b, the readout circuit 26b, and the buffer 29b are shared with devices is described. However, the present disclosure is not limited to it. It is similarly applicable when any of or any combination of the interrupt generation unit 21b, the readout circuit 26b, and the buffer 29b are shared with devices.

In the second embodiment, the case in which the interrupt circuit 20b has the buffer 29b is described. However, the present disclosure is not limited to it. It is similarly applicable when the buffer is arranged in the main memory which is coupled to the CPU 3 and the value of the counter 25b is written in the buffer through the communication circuit 5b. The interrupt circuit 20b may have a buffer for each error level or may record information at a plurality of error levels together with the error level in one buffer.

In the second embodiment, the interrupt generation unit 21b generates an interrupt in the conditions of "a mask is cancelled" and "a counter value is not 0". However, in such conditions, the counter 25b may perform writing of a counter value in the buffer 29b without generating an interrupt by the interrupt generation unit 21b. In this case, in a condition of "there is an entry of unprocessed error information in the buffer 29b", the interrupt generation unit 21b may generate an interrupt. Here, "unprocessed" refers to a state where information is written in the buffer 29b by the interrupt circuit 20b and then is not read by the error processing unit 32b.

In this case, for example, a number of the last entry written by the interrupt circuit 20b and a number of the last entry read by the error processing unit 32b are arranged in locations accessible from both the interrupt circuit 20b and the error processing unit 32b. Then, when the entry number read by the error processing unit 32b is renewed, the interrupt generation unit 21b may generate an interrupt in the case that there is a difference between the respective numbers or a difference occurs in the respective numbers.

Alternatively, a space for each counter is secured in the buffer 29b, and a flag is provided, in each space, to be set when the interrupt circuit 20b writes a counter value and to be reset when the error processing unit 32b reads the value. In the case that there is a flag still set when the error processing unit 32b resets or in the case that the number of set flags becomes 1 or more from 0, the interrupt generation unit 21b may generate an interrupt. In this case, the error processing unit 32b has to be capable of resetting at least a plurality of flags at the same time. This may reduce the number of undesired interrupts.

In the first embodiment and the second embodiment, the case in which an error message is masked for each device is described. However, an error message may be masked for each bus number. When receiving the error message, the receiving circuit once notifies the error processing unit and confirms the bus number of a device that transmitted the error message. Then, the receiving circuit masks an interrupt by receiving of a following error message transmitted from a device belonging to the same bus number. Every time receiving an error message from a device belonging to the same bus number that is received during masking, the receiving circuit increments the counter for the same bus number.

In a PCIe, there is one physical device that belongs to one bus number. Thus, the resources, such as the counters, are not secured by a difference in the device number or the function number, thereby enabling saving of the resources of the receiving circuit.

When the number of the devices allowed for coupling is restricted, the interrupt circuit may be provided with circuits only for the restricted BDF. The interrupt circuit is provided with fixed circuits when the BDF is fixed, and is changeable by setting when the BDF is variable. The interrupt circuit is provided with the circuits only for the restricted BDF, thereby enabling saving of the resources and reduction in the physical circuit implementation area, reduction in power consumption, and the like.

Third Embodiment

In the first embodiment and the second embodiment described above, the case in which the counter is incremented by 1 every time an error message is received is described. However, a counter may be incremented by 1 for one or more error messages received in a preset time. Therefore, in the third embodiment, an interrupt circuit that increments a counter by 1 for one or more error messages received in a preset time is described.

Figure 9:
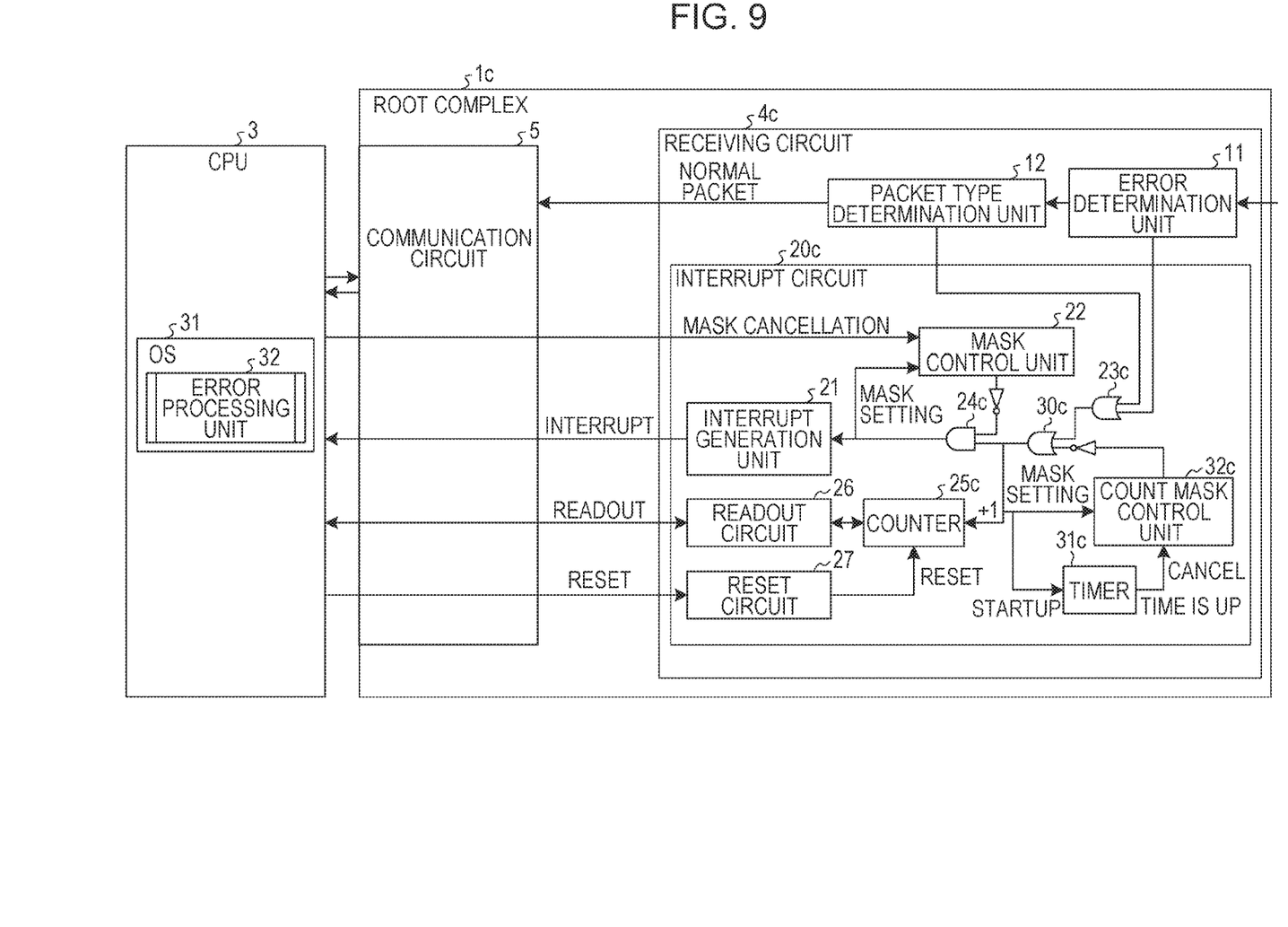
FIG. 9 is a block diagram illustrating a configuration of an interrupt circuit according to a third embodiment.

FIG. 9 is a block diagram illustrating a configuration of the interrupt circuit according to the third embodiment. Here, for the convenience of description, an identical reference character is given to a functional unit that plays a similar role to the respective unit illustrated in FIG. 1 to omit detailed descriptions thereof.

As illustrated in FIG. 9, a root complex 1c includes a receiving circuit 4c and the communication circuit 5. The receiving circuit 4c has a function of masking a count of error messages for a predetermined time and includes the error determination unit 11, the packet type determination unit 12, and an interrupt circuit 20c. The interrupt circuit 20c includes the interrupt generation unit 21, the mask control unit 22, an OR circuit 23c, an AND circuit 30c, an AND circuit 24c, a counter 25c, the readout circuit 26, the reset circuit 27, a timer 31c, and a count mask control unit 32c.

The OR circuit 23c implements a logical sum of an error notification from the error determination unit 11 and an error notification from the packet type determination unit 12. Then, the OR circuit 23c outputs the result to the AND circuit 30c. The AND circuit 30c implements a logical product of output of the OR circuit 23c and negation of output of the count mask control unit 32c. Then, the AND circuit 30c outputs the result to the AND circuit 24c, the counter 25c, the count mask control unit 32c, and the timer 31c.

The AND circuit 24c implements a logical product of negation of a mask output of the mask control unit 22 and output of the AND circuit 30c. Then, the AND circuit 24c outputs the result to the interrupt generation unit 21 and the mask control unit 22. When the output of the AND circuit 30c is 1, the counter 25c increments the counter value by 1. The counter 25c is reset by the reset circuit 27.

The timer 31c is started when the output of the AND circuit 30c is 1 and measures the time to mask the count of error messages. When the time is up, the timer 31c instructs the count mask control unit 32c to cancel the mask. Time setting of the timer 31c may be fixed or may be set by a user. The count mask control unit 32c performs mask control in which setting is performed by output, 1, of the AND circuit 30c and cancellation by the timer 31c. The AND circuit 30c, the timer 31c, and the count mask control unit 32c perform mask control to count one or more error messages, as one, that is received during the time measured by the timer 31c.

In such a manner, in the third embodiment, the interrupt circuit 20c performs mask control to count one or more error messages, as one, that is received during the time measured by the timer 31c, thereby enabling inhibition of influence from frequent occurrence of an error caused by an instantaneous external noise. When errors frequently occur because an instantaneous external noise occurs rarely, the quality seems worse than a standard, such as, for example, a bit error rate (BER)=$10^{-12}$, at the moment. However, when the noise occurs singly, the influence may be very minor as the entire system operation and there is no trouble in management. To cope with this, the interrupt circuit 20c counts an instantaneous burst error as one not to be determined as failure due to local occurrence.

In the first to third embodiments, an interrupt to the CPU 3 when an error occurs in a PCIe bus is mainly described. However, the error processing unit may perform other processes, such as display of an error detailed factor based on the AER status register.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing device comprising:
a processor; and
a receiving circuit coupled to the processor and configured to:
  receive a packet,
  determine whether a mask for suppressing generating of an interrupt is set, when the received packet is an error message for notifying occurrence of an error in communication between the processor and any of one or more other devices,
  generate the interrupt when determining that the mask is not set,
  transmit the generated interrupt to the processor,
  set the mask,
  inhibit transmitting of the interrupt to the processor, when determining that the mask for the interrupt is set, and
  cancel setting of the mask when an instruction for cancelling the mask is received from the processor; and
  one or more counter circuits respectively configured to:

count a number of the error message received while the mask for the interrupt is set using a counter, and transmit a value of the number of the error message to the processor in accordance with an instruction from the processor, wherein the receiving circuit is configured to at a same time as one of the one or more counter circuits reads the value of the number of the error message and transmits the value to the processor, simultaneously reset the counter and cancel the setting of the mask.

2. The information processing device according to claim 1, wherein the receiving circuit is configured to reset the value of the number of the error message stored in any of the one or more counter circuits in accordance with the instruction from the processor.

3. The information processing device according to claim 1, wherein each of the one or more counter circuits corresponds to one of the one or more other devices.

4. The information processing device according to claim 1, further comprising:

a buffer to store the number of a plurality of error messages obtained by the one or more counter circuits, wherein the receiving circuit is configured to read at least any of the number of a plurality of error messages from the buffer in accordance with the instruction from the processor.

5. The information processing device according to claim 1, wherein the receiving circuit is configured to determine whether the received packet is the error message and the mask for the interrupt is set, using an OR circuit and an AND circuit.

6. The information processing device according to claim 5, wherein the receiving circuit is configured to:

input, to the OR circuit, a result of determining whether an error is detected from the received packet and a result of determining whether the received packet is the error message, input, to the AND circuit, output from the OR circuit and a result of determining whether the mask for the interrupt is set, and determine whether the received packet is the error message and the mask for the interrupt is set, based on output from the AND circuit.

7. The information processing device according to claim 1, wherein the processor is configured to output information on an error included in the error message to a display device when receiving the interrupt.

8. The information processing device according to claim 1, wherein the processor is configured to log information on an error included in the error message when receiving the interrupt.

9. The information processing device according to claim 1, wherein the receiving circuit is coupled between the processor and the one or more other devices.

10. The information processing device according to claim 1, wherein the receiving circuit is configured to:

determine whether the error message is received after the mask is set, increase the number of the error message when it is determined that the error message is received.

11. The information processing device according to claim 1, wherein the one or more counter circuits is configured to count the number of the error message for each of one or more error levels.

12. A control method executed by an information processing device including a processor, a receiving circuit coupled to the processor and one or more counter circuits, the control method comprising:

receiving, by the receiving circuit, a packet;

determining whether a mask for suppressing generating of an interrupt is set, when the received packet is an error message for notifying occurrence of an error in communication between the processor and any of one or more other devices;

generating the interrupt when determining that the mask is not set;

transmitting the generated interrupt to the processor;

setting the mask;

inhibiting transmitting of the interrupt to the processor, when determining that the mask for the interrupt is set;

canceling setting of the mask when an instruction for cancelling the mask is received from the processor;

respectively counting, by the one or more counter circuits, a number of the error message received while the mask for the interrupt is set using a counter; and transmitting a value of the number of the error message to the processor in accordance with an instruction from the processor, wherein the transmitting includes simultaneously resetting the counter and cancelling the setting of the mask at a same time of the transmitting the value of the number of the error message.

13. A non-transitory computer-readable storage medium storing a program that causes an information processing device to execute a process, the information processing device including a processor, a receiving circuit coupled to the processor and one or more counter circuits, the process comprising:

receiving, by the receiving circuit, a packet;

determining whether a mask for suppressing generating of an interrupt is set, when the received packet is an error message for notifying occurrence of an error in communication between the processor and any of one or more other devices;

generating the interrupt when determining that the mask is not set;

transmitting the generated interrupt to the processor;

setting the mask;

inhibiting transmitting of the interrupt to the processor, when determining that the mask for the interrupt is set;

canceling setting of the mask when an instruction for cancelling the mask is received from the processor;

respectively counting, by the one or more counter circuits, a number of the error message received while the mask for the interrupt is set using a counter; and transmitting a value of the number of the error message to the processor in accordance with an instruction from the processor, wherein the transmitting includes simultaneously resetting the counter and cancelling the setting of the mask at a same time of the transmitting the value of the number of the error message.

* * * * *